Oct. 5, 1943.　　　　C. G. SMITH　　　　2,330,848
GASEOUS DISCHARGE DEVICE
Original Filed Dec. 21, 1925
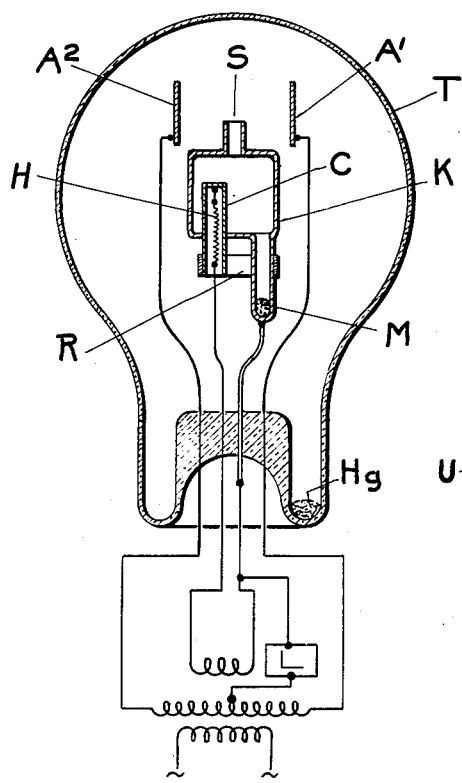
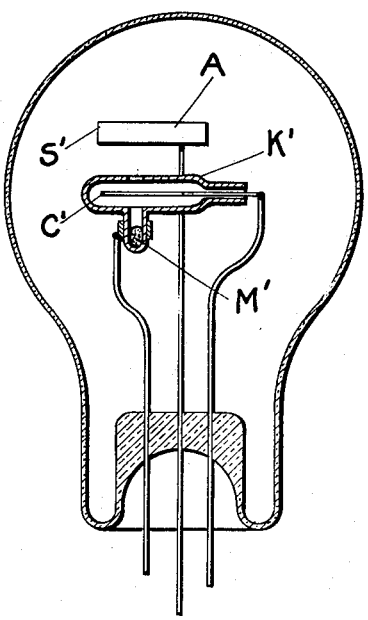
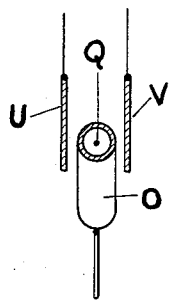
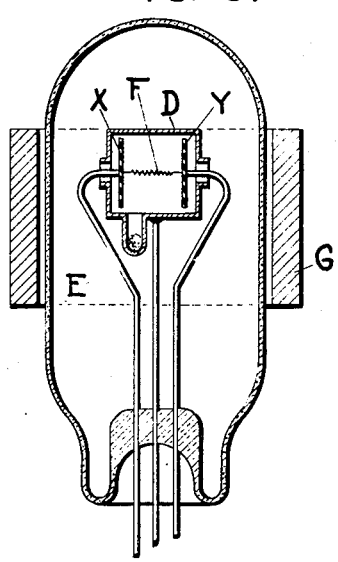
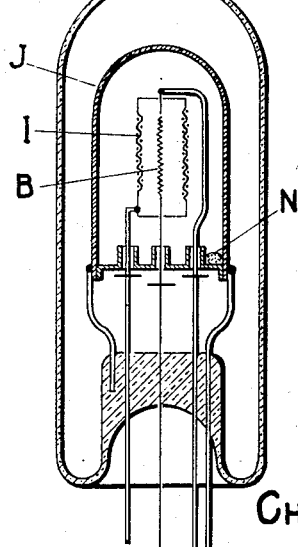
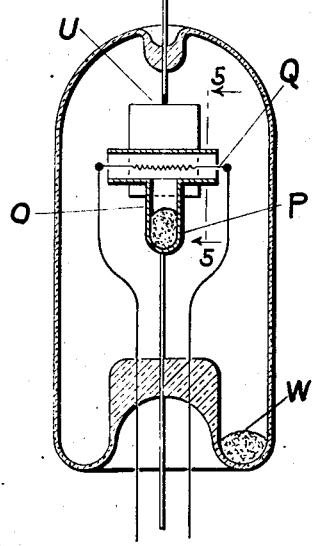
INVENTOR.
CHARLES G. SMITH,
BY Elmer J. Gorn
ATTY.

Patented Oct. 5, 1943

2,330,848

UNITED STATES PATENT OFFICE 2,330,848

GASEOUS DISCHARGE DEVICE

Charles G. Smith, Medford, Mass., assignor, by mesne assignments, to Raytheon Manufacturing Company, Newton, Mass., a corporation of Delaware Original application December 21, 1925, Serial No. 76,795. Divided and this application May 23, 1940, Serial No. 336,741

10 Claims. (Cl. 250—27.5)

This invention relates to gaseous conduction devices generally, such as rectifiers, amplifiers, oscillators, converters between D. C. and A. C., etc. This is a division of my copending application, Serial No. 76,795, filed December 21, 1925.

In one aspect the invention involves the discovery that a hot cathode operated in the presence of certain easily ionizable gases having a strong affinity for the cathode material, such as the vapor of an alkaline earth metal (barium, strontium and calcium), is a powerful source of electrons. For example, in an atmosphere of calcium vapor at a pressure of the order of $10^{-5}$ mm., tungsten emits a large thermionic current at temperatures below 1800° C. and nickel at about 1000° C.

In another aspect the invention comprises means for maintaining a supply of the vapor at the active surface of the cathode. This may be accomplished, for instance, by incorporating an alkaline earth metal within the device and heating the metal to vaporizing temperature, thereby generating the vapor within the tube or container. The electron-emitting surface is preferably confined by an enclosure having only a restricted opening for the cathode-anode discharge, the enclosure comprising either the walls of a hollow cathode or an additional part surrounding the cathode and the alkaline earth metal vapor is preferably confined substantially to the interior of this enclosure, as for example by generating the vapor within the enclosure by heat derived from the cathode-anode discharge or auxiliary heating means, or both.

The foregoing and other objects of the invention will be best understood from the following description of exemplifications thereof shown diagrammatically in Figs. 1 to 6 of the accompanying drawing.

In the space discharge device illustrated in Fig. 1, T represents the tube or vessel which may be of any suitable construction and $A_1$ and $A_2$ plate anodes. Cooperating with the anodes is a partially open hollow electrode structure comprising an enclosure K having an extended interior thermionically-emitting cathode surface provided by C, a tubular electron emitter, constituting a hollow housing member extending into the interior of enclosure K and segregating the space in the interior of C from the space of said enclosure. The housing member C has a thermionically-emitting cathode surface on its exterior within the enclosure K. A heater H is disposed in the hollow housing member C for heating the cathode surface to a temperature of thermionic electron emission during operation. The enclosure K also has a restricted opening S for the electrical discharge passing between the interior of K and the other electrodes or anodes $A_1$ and $A_2$, M the vapor source, such as calcium or an alloy of calcium disposed in the bottom of an elongated tubular appendix to K, and R a band for conducting heat from the tubular electron emitter C to said appendix. Hg is a drop of mercury for maintaining mercury vapor throughout the tube. As illustrated, the device is connected to a rectifying circuit, including a load L, the filament H being heated by an auxiliary coil connected to the heater H and enclosure K in series.

In operation the filament H is heated sufficiently to vaporize the metal M to the desired pressure. When employing calcium, for example, the temperature of the metallic calcium may be approximately 500° C. The interior of enclosure K is preferably heated to a higher temperature (e. g. 1000° C. when using calcium), this difference in temperature within K being due in part to the long narrow appendix, in part to the location of the heater, and in part to the electrical discharge through the upper part of the enclosure. Calcium vapor has such strong affinity for cathode metals (e. g. tungsten), that it is not rapidly driven off from C at temperatures affording large thermionic emission. For example, the vapor pressure of the calcium on C may not be greater than $10^{-5}$ mm. even when C is hot enough for large thermionic currents, whereas the vapor pressure of pure calcium at such temperatures would be thousands of times as much. Thus the electron emission from C is greatly enhanced by the calcium. The source M, which is contained in its appendix or compartment communicating with the cathode surface, constitutes a metal supply of the alkaline earth metal, spaced from the cathode surface, for supplying the metal to the cathode surface to enhance and maintain copious electron emission from said surface as described above.

When employing a low vapor pressure within K (e. g. calcium vapor at $10^{-5}$ mm.), the escape of the vapor through opening S (which may be $\tfrac{1}{16}$ inch in diameter) is slow even when unimpeded. By filling the space outside the enclosure K with an inert gas as disclosed, the vapor can escape only by diffusion which is very slow. Moreover, by employing a considerable cathode-anode discharge (e. g. several amperes per square cm.), I believe that the vapor may be retained within the enclosure by an electric pumping action. In accordance with my present understanding of the theory of the operation of my device, this action is as follows:

The mercury vapor (at a pressure of the order of magnitude of 10 microns of mercury, e. g.) serves as an ionizable gaseous medium to conduct current through the opening S, the positive ions formed in the mercury vapor permitting large electronic discharge through S with the application of only a few volts (e. g. ten volts). Thus the pressure of the gas in the enclosure K, which gas in this instance comprises mercury vapor and alkaline earth metal vapor, is at a pressure sufficiently high to secure a discharge between the cathode surface and the anodes $A_1$ and $A_2$ at a voltage of the order of the ionization voltage of the gas. Under these conditions the cathode voltage drop is low and likewise of the order of the ionization voltage of the gas. Herein a discharge with a low cathode voltage drop will be termed "a low voltage discharge." Since the ionization voltage of calcium vapor is 6 volts while that of mercury vapor is 10.4 volts, the calcium vapor is intensely ionized by the heavy discharge through the restricted opening S and the calcium ions are drawn back into the enclosure. When the discharge is passing under such conditions, the spectrum of calcium is strong inside K and absent outside.

From the foregoing it will be evident that the material M is heated independently of the cathode-anode discharge (although it may also derive some heat from the discharge), the appendix being too long and narrow to permit the discharge to pass directly to the material. Consequently the vapor pressure of the calcium may be maintained sufficiently low to prevent substantial loss through opening S throughout a wide range of operating currents. I believe that by confining the calcium vapor to the enclosure K, a pressure differential is maintained between the cathode and anode, the active vapor having a higher pressure near the electron-emitting surface, that is, within the enclosure. During operation the alkaline earth metal vapor may be sufficient in amount to constitute a gaseous filling within the enclosure K at a pressure high enough to secure a discharge between the anodes $A_1$ and $A_2$ and the interior of K.

The form of the invention illustrated in Fig. 2 differs from that of Fig. 1 in that the cathode C′ is in the form of a rod of nickel, tungsten or other suitable material, and is spaced from the enclosure K′ so that the main discharge through opening S′ between cathode C′ and anode A may be started by first producing an auxiliary discharge between C′ and K′ at a voltage of the order of 110 volts (A. C.). This auxiliary discharge heats K′ and C′ until the calcium M′ begins to vaporize, whereupon the action is similar to that described in relation to Fig. 1. The regulation of the circuit supplying the discharge between K′ and C′ is such that its voltage drops rapidly as the current between K′ and C′ increases. Thus K′ heats until it becomes an appreciable emitter of electrons, whereupon no further rise in temperature takes place since the voltage between C′ and K′ has dropped to a low value and the regulation of the circuit prevents further increase in temperature, whereby the temperature of K′ is sensibly constant and self-regulating. Consequently, the appendix containing the material M′ is designed to be heated to a predetermined temperature (about 500° C, when M is calcium) by a container K′ of constant temperature.

The use of an inert gas in the tube restrains the escape of the calcium vapor through opening S′ by virtue of the diffusion phenomenon, and in a device such as illustrated in Fig. 2 the gas may, for example, be argon or neon at approximately two centimeters pressure.

The device illustrated in Fig. 3 comprises a cylindrical enclosure D having its ends closed except for small axial openings, a filament F having its leads extending through said openings, insulating disks X and Y mounted on said leads to obstruct discharge from the filament through the openings, an appendix containing the vapor material E (for example calcium) and a magnet G for producing a field along the axis of D. When the filament is heated by current therethrough, it heats D and vaporizes E. The vapor makes F an excellent electron emitter and provides positive ions to neutralize the space charge between F and D, the discharge passing between F and D. By employing an exceedingly low pressure (e. g. .001 mm.), the discharge may be controlled by the magnetic field, the intensity of which determines the voltage drop in the device. This tube may be used to rectify alternating current by impressing upon the constant field an alternating field in synchronism with the current to be rectified (see prior Patent No. 1,617,172), whereby the tube will be conducting during one-half cycle and non-conducting during the other half-cycle. Thus even though both terminals F and D be good emitters of electrons, the device will rectify.

In Fig. 4, which illustrates an application of the invention to a three-electrode tube of the audion type, B is a cathode filament, I a cylindrical grid, and J a cup-shaped anode serving as a vapor enclosure, each supported upon its respective lead or leads, the filament having two leads as usual. The lower end of the cup-shaped anode has a closure provided with three tubular openings for the leads to the filament and grid. The vapor yielding material (e. g. calcium) may be located at N where it is vaporized chiefly by radiation from the filament B. By making said tubular openings narrow, the escape of calcium vapor is minimized and by making them extend a considerable distance into the enclosure J, they are heated sufficiently to prevent the calcium from condensing therein. Disk baffles may be mounted on the leads just outside the said openings to prevent condensation on the stem, the small amount of calcium which escapes through said openings condensing upon the cool baffles. If desired, an inert gas may be incorporated in the tube as above described. This device may be used in any one of the many ways for which tubes of the audion or grid type are adapted.

In Figs. 5 and 6 the closure O is tubular and T-shaped. The lower end of the enclosure is closed and contains the calcium or other vapor material P. The horizontal ends of the enclosure are open, and extending therethrough is a filament Q which heats the enclosure and vaporizes the calcium. The filament may be formed of tungsten and, when using calcium vapor at a pressure of the order of $10^{-5}$ mm. e. g., may be heated to approximately 1300° C. The plate anodes U and V are located on opposite sides of the enclosure. A drop of mercury W may be incorporated in the tube as above described.

In operating a device of the type illustrated in Figs. 5 and 6, either the filament Q or the enclosure O may be used as the cathode. When filament Q is connected as the cathode, it emits a copious supply of electrons under the stated conditions, and the discharge passes to the anodes through the open ends of the enclosure O. When the enclosure is connected as a cathode, it acts as a hollow cathode structure and emits chiefly from its interior electron-emitting surface by virtue of the heat derived from the filament, the calcium coated on its inner surface, and the ionized calcium vapor inside the enclosure. Calcium, as well as the other alkaline earth metals and equivalent materials, when used as a coating in this way, emit substantial quantities of electrons at the relatively low temperature. The filament Q inside the hollow cathode structure O is directly exposed to the electron-emitting surface, and can be independently heated to maintain the coating on said surface at temperature of electron emission to sustain a discharge between said surface and the other electrodes or anodes U and V.

The invention is not limited to the particular detail and arrangements described above, but its principles are applicable to many other constructions that will suggest themselves to those skilled in the art. It is accordingly desired that the appended claims be given a broad construction.

What is claimed is:

1. A space discharge device comprising an envelope, main electrodes mounted therein, including a solid thermionic cathode, said cathode having a surface coated with an electron-emissive material which is substantially non-vaporizable at the normal operating temperature of said envelope, a supply of said material located in said device for supplying said material to said surface during operation to enhance and maintain copious electron emission from said surface, a gas in said envelope at a pressure at which an electrical discharge between said electrodes may be operated with a drop of voltage at the cathode of the order of the ionization voltage of said gas, and electrode means operable to produce an auxiliary discharge in said gas with a materially higher cathode voltage drop, said means being located adjacent the space between said main electrodes.

2. A space discharge device comprising the combination of an envelope, main electrodes therein, including a solid thermionic cathode, said cathode having a surface coated with an electron-emissive material which is substantially non-vaporizable at the normal operating temperature of said envelope, a supply of said material located in said device for supplying said material to said surface during operation to enhance and maintain copious electron emission from said surface, a gaseous filling therefor at a pressure within the range of the order of about ten microns to several millimeters of mercury, and auxiliary means located adjacent the space between said main electrodes and operable to produce an ionizing discharge in said gaseous filling at a voltage above the order of the ionization voltage of said gaseous filling.

3. A space discharge device comprising a vessel having therein a discharge space, a shield around said discharge space spaced from an interior wall of said vessel for substantially preventing extension of the discharge from the space within said shield, an anode surface and a cathode surface surrounded by said shield, said cathode surface to be heated to temperature of thermionic emission during operation, an ionizable vapor in said shield, a vaporizable material within said shield for supplying said vapor, and means for confining said material and vapor substantially solely to the interior of said shield.

4. A space discharge device comprising a vessel having therein a discharge space, a shield around said discharge space spaced from an interior wall of said vessel for substantially preventing extension of the discharge from the space within said shield, an anode surface and a cathode surface surrounded by said shield, said cathode surface to be heated to temperature of thermionic emission during operation, an ionizable vapor in said shield at a pressure within the range of the order of about ten microns to several millimeters of mercury, a vaporizable material within said shield for supplying said vapor, said shield having an opening connecting the interior of said shield with the interior of said vessel, said opening being restricted to prevent excessive diffusion of said vapor from said shield.

5. A space discharge device comprising a vessel having therein a discharge space, a shield around said discharge space spaced from an interior wall of said vessel for substantially preventing extension of the discharge from the space within said shield, an anode surface and a thermionic cathode surface surrounded by said shield, an ionizable vapor in said shield at a pressure sufficient to supply during operation the requisite number of ions necessary to neutralize the space charge of the electron current between said cathode surface and said anode surface to the desired extent, said shield having an opening connecting the interior of said shield with the interior of said vessel, and a baffle adjacent said opening for condensing vapor diffusing through said opening.

6. A space discharge device comprising a vessel having therein a discharge space, a shield substantially completely enclosing said discharge space spaced from an interior wall of said vessel for substantially preventing extension of the discharge from the space surrounded by said shield, an anode surface and a thermionic cathode surface surrounded by said shield, a source of vapor in said shield, said shield during operation being at a temperature to vaporize said source of vapor and maintain the vapor generated at a predetermined pressure within said shield.

7. A space discharge device comprising a vessel having therein a discharge space, a shield substantially completely enclosing said discharge space spaced from an interior wall of said vessel for substantially preventing extension of the discharge from the space surrounded by said shield, an anode surface and a thermionic cathode surface surrounded by said shield, a source of vapor in said shield, said shield during operation being at a temperature to vaporize said source of vapor and maintain the vapor generated at a predetermined pressure within said shield, and control means for controlling the discharge between said anode and cathode surfaces.

8. A space discharge device comprising a vessel having therein a discharge space, a shield substantially completely enclosing said discharge space spaced from an interior wall of said vessel for substantially preventing extension of the discharge from the space surrounded by said shield, an anode surface and a thermionic cathode surface surrounded by said shield, a source of vapor in said shield, said shield during operation being at a temperature to vaporize said source of vapor and maintain the vapor generated at a predetermined pressure within said shield, and magnetic control means for controlling the discharge between said anode and cathode surfaces.

9. A space discharge device comprising a vessel, a hollow electrode in said vessel, and a heater electrode extending into the hollow space of said hollow electrode, said hollow electrode constituting an enclosure confining the discharge space between said two electrodes and segregating said discharge space from the walls of said vessel, and a source of ionizable vapor in said enclosure, said heater electrode being designed to vaporize during operation said source of vapor and produce in the enclosed space an atmosphere of said vapor confined substantially solely to said enclosure.

10. A space discharge device comprising a vessel, an electrode assembly in said vessel comprising an anode, and a cathode having a thermionically-emitting surface designed to be heated to thermionic emission during operation, said electrode assembly constituting an enclosure spaced from the walls of the vessel and surrounding the entire discharge space between said emitting surface and said anode, and a source of discharge promoting vapor in said device for supplying vapor to said enclosure, said enclosure confining during operation said vapor in said enclosure confined substantially solely to said enclosure.

CHARLES G. SMITH.